July 8, 1947. S. JOHNSON 2,423,501
RETRACTABLE LANDING GEAR LOCK FOR AIRCRAFT
Filed Dec. 29, 1942 2 Sheets-Sheet 1
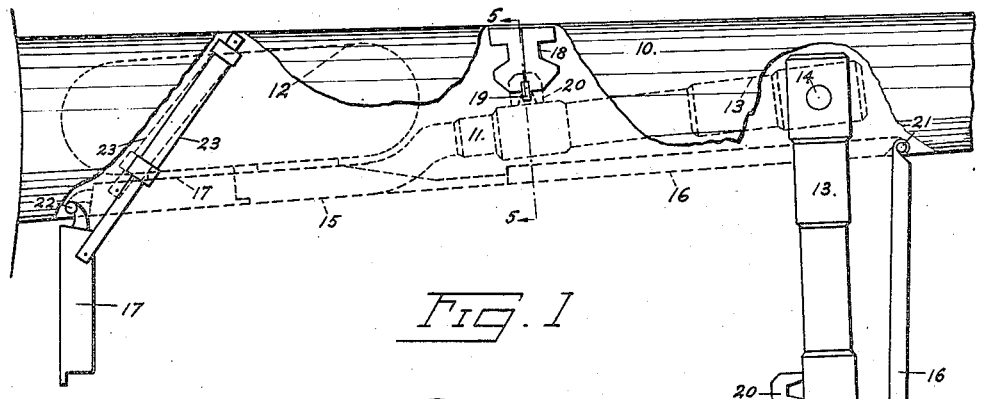
INVENTOR:
SETH JOHNSON;
BY Robert C Rasche
ATTORNEY.

July 8, 1947.   S. JOHNSON   2,423,501
RETRACTABLE LANDING GEAR LOCK FOR AIRCRAFT
Filed Dec. 29, 1942   2 Sheets-Sheet 2
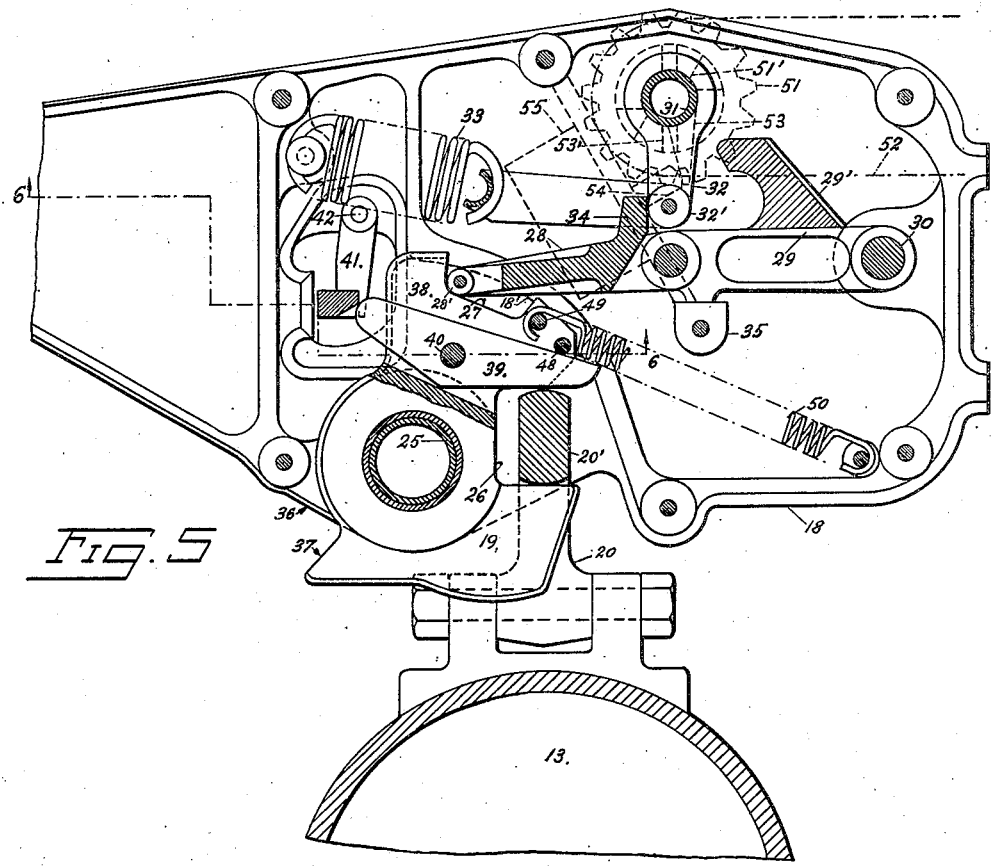
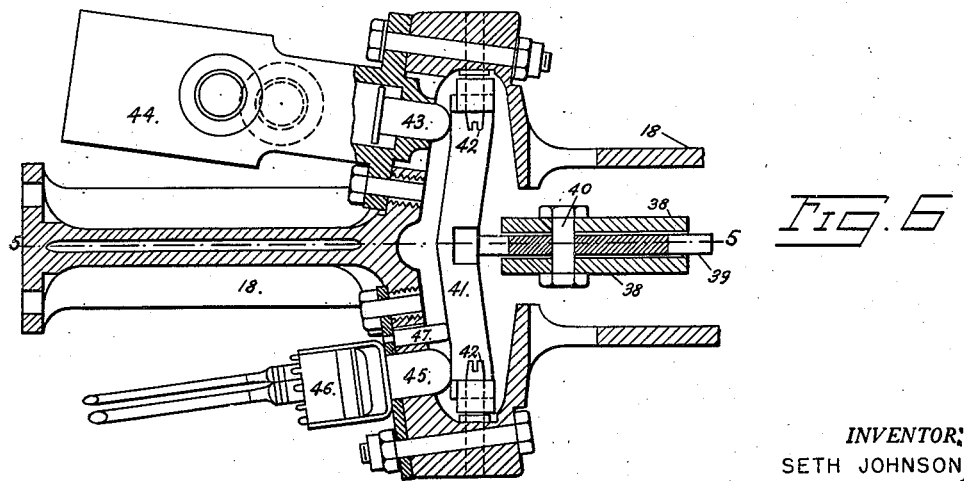
INVENTOR:
SETH JOHNSON;
BY
Robert C. Rasche,
ATTORNEY.

Patented July 8, 1947

2,423,501

UNITED STATES PATENT OFFICE 2,423,501

RETRACTABLE LANDING GEAR LOCK FOR AIRCRAFT

Seth Johnson, Farmingdale, N. Y., assignor to Republic Aviation Corporation, a corporation of Delaware Application December 29, 1942, Serial No. 470,460

12 Claims. (Cl. 244—102)

This invention relates to retractable landing gear lock for aircraft and more particularly to the provisions for alighting and arising.

Most present-day airplanes have a so-called "three-point landing gear" for alighting on, and arising from, solid areas, which gear comprises, usually, two retractable main landing-legs located under the wings and carrying ground-engaging wheels, and a third wheel located near the tail.

The present invention is concerned chiefly with these retractable and protractable main legs, and its general object is to provide means for positively seizing and securely restraining these legs in their retracted position in the wing, so that there will be no possibility of a retracted leg disengaging and dangling in the air-stream, yet which will positively release same without peradventure of failure when desired, so that these legs can invariably be lowered before landing, thus obviating one of the most prolific causes of disaster in operating airplanes.

More particularly, it is an object of the invention to provide a retractable landing-leg "up-lock" of this improved nature which will be automatically set in train in retraction and protraction, by the very same actuating means that set in train the retracting and protracting mechanism of the landing leg itself and the movable fairing for the retractable landing gear, whereby to provide this novel additional safety feature for airplanes without adding to the already quite numerous control members in the pilot's cockpit.

Still more particularly is it an object of the invention to provide a landing-leg locking system which will operate in two distinct stages: one comprising, in retraction, a direct engagement of the leg by the grasping mechanism per se, and the other, a positive but automatic locking of the leg-grasping parts after the leg has been fully retracted; and vice versa for protraction—thus providing two-fold security in both locking and unlocking the landing leg.

Yet another specific object of the invention is to provide means for indicating visually to the pilot the fact that the landing leg has definitely reached its fully retracted position and is positively grasped by a part of the locking mechanism, together with means for thereafter visually indicating to the pilot the fact that this grasping part itself has now been locked; these indicating means also, in protraction, in reverse order, visually signalling when the locking means for the leg-grasping part have been released and then indicating when the leg-grasping part itself has been released from engagement with the leg.

A noteworthy feature of the invention consists in the provision in the mechanism that locks the leg-seizing group, of safety means for positively and infallibly unlocking the mechanism that locks the leg-seizing members, whereby, should the latter become inoperative due to a failure, as of some other part of the airplane, the landing-legs will nonetheless be invariably unlocked for lowering, thereby minimizing to the extreme any danger of the pilot's having to attempt to land with the landing-gear in the retracted position.

Another feature of the invention consists in the provision of means inherent in the locking mechanism itself whereby, as long as the landing-gear operating handle in the cockpit is in its "down" position, the leg will invariably be in released condition, and be free to be protracted or lowered by the influence of gravity, alone, which feature is of eminent value in case the independent hydraulic leg-protracting system should fail or become inadequate.

The other objects of the invention, as well as the numerous other features of advantage and improvement, will be made manifest as this disclosure proceeds.

The presently-preferred form of embodiment of the inventive concepts will be described, by way of exemplification only, in conjunction with the accompanying drawings, in which Figure 1 is a fragmentary front elevation of the port side of an airplane, with parts broken away to show one of the main landing-legs in extended position in full lines, showing in dotted lines, the leg in retracted and locked position;

Figures 2, 3 and 4 are diagrammatic views, taken substantially along line 5—5 of Figure 1 to show three different positions of the leg locking mechanism.

Figure 5 is a detailed fore-and-aft section along line 5—5 of Figure 1, showing the mechanism in its leg-locking position; and Figure 6 is a fragmentary section along line 6—6 of Figure 5.

The invention will be described in detail as embodied in the port-side landing gear of the airplane, but it is to be understood that its structure, operation and function are duplicated in connection with the starboard side landing-leg.

In Figure 1, the port wing 10 of an airplane is shown provided with a landing-leg including a shock absorbing strut group 11, 13, carrying a landing wheel 12. The cylinder 13 of the telescopic oleo strut is pivoted to the structural frame of the wing 10, as at 14. The landing-leg is adapted to be retracted into the wing in flight by hydraulic means, not shown, and in order to receive the landing-leg and associated parts, the under-surface of the wing is provided with a cut-out comprising a wheel-well and a strut-well, the landing-leg being provided with a two-part fairing, 15 and 16, and the wing with a wheel-well door, 17, in order to close these wells during flight. In retracted position, the wheel 12 occupies the wheel-well, the strut occupies the strut-well, and the cut-out in the wing is closed by means of the tri-partite fairing, 15, 16, 17, as shown in dotted lines in Figure 1. The fairing-portion 15 is attached rigidly to the fork of the wheel, the portion 16 being pivotally secured as at 21 outboard of the strut, and part 17 is pivoted as at 22 inboard of the strut. The fairing-portion 17, is adapted to be operated by means including a hydraulic motor 23, which is actuated by means including a handle 24.

The landing-leg is adapted to be locked in its retracted position, by means of a lock group indicated in Figure 1 by the numerals 18, 19 and 20. The operation of this locking mechanism is controlled by the lever 24, which is located in the cockpit closely adjacent to the pilot's seat, the same lever also controlling the retraction and protraction of the landing-leg and the opening and closing of the door 17.

More specifically, the locking group comprises a casing 18, elongated in the fore-and-aft direction, rigidly attached to the wing framing, and divided substantially on its fore-and-aft center plane, as shown in Figure 5, but united by suitable bolts. The casing 18 carries a locking-hook 19, pivoted therein for cooperation with a lug or eye 20, fixed to the inboard side of the landing-leg in parallelism with the major axis thereof. The hook 19 is mounted for rotation fore-and-aft in the casing 18, on a stationary tube 25, extending across the casing 18, as shown in detail in Figure 5, and is provided with a hooking notch 26, in which, on occasion, enters the traverse 20' of the lug 20. The hook 19 is constantly subjected to the action of a spring 50, and therefore, tends to be maintained in an open position. Hook 19 is also provided with a notch 27, in which travels a roller 28' carried at the free end of a toggle-group 28, 29, pivoted to the casing 18, parallel to its fore-and-aft plane, as at 30. The lever 29 of the toggle 28, 29 carries a hooked finger 29' which lies in the arcuate path of the roller 32'. The roller 28' is urged and guided along an arcuate flange 18' of the casing 18 forming a curved track concentric with the shaft 25, whereby roller 28' is positively enclosed and restrained and prevented from emerging from the notch 27, thereby disengaging from the member or hook 19. The clockwise rotation of the hook 19 about the shaft 25 is halted when a shoulder 37 on the hook 19 meets a flange 36 in the casing 18.

The roller 32' is mounted on the end of a control shaft 31, and on that end of the control shaft 31 which projects outside the casing 18 is loosely mounted a sprocket wheel 51 (Figure 5), which sprocket wheel is mechanically connected to the hand lever 24 for operation thereby, by means of a sprocket chain 52 and a cable (not shown). The hook 19 is positively restrained and prevented from rotating clockwise on the fixed shaft 25—as under the action of the weight of the gear and the action of the spring 50—by the locking action of the aligned toggles 28, 29, which are themselves held in active or locking position against the stop 35 by means of the roller 32' on the locking arm 32.

In the locked position of the landing gear, shown in Figures 2 and 5, the roller 32' is maintained against an abutment 34—carried by the lever 28 of the toggle group—by means of a spring 33 anchored to the casing 18 at one end thereof. Thus, the toggle 28, 29 will remain in its active, locking position as long as no moment of a magnitude sufficient to overcome the load of the spring 33 is applied counterclockwise on the control shaft 31, since, in this locked position, the locking arm 32 extends radially at right angles to, and bears against, the toggle group now lying substantially in a straight line. A stop, 35, carried by the casing 18, prevents the toggle from ever reaching a dead-center position, thereby obviating the operational and structural complexities otherwise entailed.

The top part 38 of the hook 19 is divided, as shown in Figure 6, to accommodate a lever or dog 39, pivoted on a transverse bolt 40. When, in the retraction of the landing-leg, the traverse 20' enters the notch 26, it meets that end of said lever 39 which then lies below the top of the notch 26 before it contacts the top of the notch. As the hook 19 is constantly under the action of the spring 50 tending to keep it in an opened position with the shoulder 37 bearing against stop 36, the lever 39 begins to pivot counterclockwise about the bolt 40 before hook 19 begins to pivot counterclockwise about the shaft 25, which pivoting of hook 19 is affectuated by the lifting action of the traverse 20' on the landing-leg undergoing retraction. This relative motion of the lever 39 with respect to the hook 19 has the effect of depressing the opposite end of the lever 39, which then acts as a cam and rocks a swingably mounted lever 41 swivelled at points 42 to casing 18. The cross-bar of lever 41 is thus urged simultaneously against a spring loaded push button 43 of a timing valve 44 and a spring loaded push button 45 on an electrical switch 46. The timing valve 44 synchronizes and controls the operation of the hydraulic motor 23, provided for closing the wheel well door 17, when the leg has almost reached its fully retracted position within the wells of the wing 10, while the switch 46 then closes the operating circuit of a landing gear "up" indicator (not shown), located in the cockpit to indicate to the pilot when the first stage of the locking operation has been completed; that is, that the eye 20' has entered the notch 26 and that the leg has reached its fully retracted position but has not yet been securely locked.

An adjustable stop 47 (Figure 6) is mounted in the casing 18 to limit the travel of the cross-bar 41 in operating the push buttons 43 and 45. A fixed stop 48, (Figure 5), consisting of a pin mounted across the bifurcated part 38 of the hook 19 limits the counter-clockwise rotation of the lever 39 around its pivot 40. Another fixed pin, 49, serves to engage the active end of spring 50, the opposite end of which is anchored to the casing 18.

The control shaft 31 carries, in addition to the sprocket wheel 51 and the locking arm 32, a tapered radial arm 53, adapted to act, on occasion, as a striker upon a push button 54 of an electric switch 55 when the locking arm 32 is about to reach its active position. This second switch 55 actuates an independent indicator in the cockpit when the arm 32 positively engages and locks toggle 28, 29 beyond peradventure of failure, to thus conclusively indicate to the pilot that the gear is now in the second phase of locking; that is, to indicate not only that the gear is retracted and embraced by the locking hook, but that said locking hook is itself positively, directly and with absolute safety, locked finally and securely in its retracted position.

The radial arm 53 is secured to the control shaft 31 in a predetermined angular relationship to the locking arm 32, which is also secured to the control shaft 31. The specific degree of this angular relationship depends upon, and is determined by, the other characteristics of the remainder of the system and thus varies from airplane to airplane. The hub of the sprocket wheel 51 carries a pair of diametrically opposed dogs 51' which cooperate with a corresponding pair of radial dogs 53' fixed on the hub of the striking arm 53, so that the sprocket wheel 51 will rotate loosely through a definite arc on the control shaft 31 before the dogs 51' will meet and engage the dogs 53' to connect the sprocket 51 to the control shaft 31 for operation thereof.

In order to unlock the landing-leg, preparatory to lowering same for a landing—assuming the landing-leg to be in the retracted position with the lever 24 in the "up" position of Figure 2, the doors 17 closed, the leg-retracting cylinder (not shown) under retracting pressure, the lug 20 engaged by the hook 19 and the toggle group being in a straight line and locked by the roller 32'—the pilot then moves the handle 24 from its "up" position into its "down" position, as shown in Figure 3, and the resultant motion is transmitted by cables (not shown) and by chain 52 to the sprocket wheel 51, whereby same is rotated counter-clockwise. However, until the dogs 51' meet the dogs 53', this rotation has no effect on the control shaft 31, but further on in the sequence of events, the sprocket 51 drives the shaft 31 and the arm 32 moves from the position shown in Figure 2 into the position shown in Figure 3. Thereby the locking action on the toggle group 28, 29 is removed, permitting the latter to "break," or collapse, due to the urge of the hook 19 under the influence of the spring 50. The latter also immediately starts to rotate clockwise under the weight of the landing-leg and the action of the spring 50, thereby urging the roller 28' along the curved track 18' and displacing the hook 19 until the eye 20' is no longer engaged by hook 19, leaving the leg unlocked and ready to be lowered by the independent landing gear hydraulic system.

Movement of the handle 24 into the "down" position is usually sufficient in itself to unlock the landing-leg, but, to meet the contingency that the moment tending to rotate the hook 19 around the axis 25 (which moment is derived from the weight of the landing-gear and the action of the spring 50), may not—due to inadequacy of the landing gear system itself, or, due to the toggle becoming inoperative and remaining immobile even after it has been unlocked—be sufficient to collapse the toggle, the lever 29 of the toggle, provided with the hook 29', comes into action substantially midway between the position shown in Figure 2 and the position shown in Figure 3 of the lock group. The roller 32' then being positively rotated, engages this hook 29' and forces the lever 29 to rotate clockwise about the pivot 30, thus definitely "breaking" the toggle 28, 29 on such occasions as may arise under conditions as predicated above.

Thus the toggle group 28, 29 is positively unlocked and releases the hook 19 for rotation clockwise under the weight of the downward falling, gravity-actuated landing-leg, well before the independent hydraulic system of the landing gear has commenced to positively force the landing-leg downward, although the sprocket 51 responds immediately to the initial motion of the lever 24 and notwithstanding the fact that the opening of the valve for the reversal of flow in the hydraulic motor 23 definitely precedes the unlocking of the toggle. This circumstance derives from the inertia and relatively slow response of the fluid compared to the relatively high speed of the mechanical actions set in train by shifting the handle 24 from its "up" position into its "down" position, and to the rapid movement of this handle itself by the pilot. After it has been unlocked by actuating the lever 24, hydraulic power is not necessary to extend same, since it merely adds its cumulative effect to the weight of the leg at the end of the clockwise rotation of the hook 19 in the position shown in Figure 3.

Indeed, in case of failure or immobilization of the separate hydraulic system of the landing gear itself, the mechanism of the present invention is eminently well adapted to permit, by virtue of its inherent characteristics, a simple, direct, gravity operated lowering of the leg into extended position. For, as long as handle 24 is left locked in its "down" position, the arm 32 is maintained in the position of Figure 3 by means of the pull of the cable and chain 52 against the action of the tension spring 33 and this arm, in turn, maintains the toggle group 28, 29, by means of roller 32' and hook 29', in the position shown in Figure 3; thus, the leg is then in released condition and can fall downwardly into extended position under the action of gravity.

When the pilot, desiring to retract the leg, as after taking-off, moves the handle 24 from the "down" to the "up" position, the roller 28' is moved from one end of the notch 27 to the other under the action of the spring 33, as shown in Figure 4, and the landing leg, by means of the traverse 20'—simultaneously with effectuating the operation of the switch 46 and the timing valve 44—begins to urge the hook 19 in a counter-clockwise direction, resulting in thereby lifting and straightening the toggle members 28 and 29. Simultaneously, the locking arm 32 is returned to its active locking position by the action of the same spring 33 and the striker 53 acts to operate the switch 55, which actuates the signal that indicates that the leg is not only in its fully retracted position, but that the second phase of the locking has been completed and that the leg is definitely and safely retained in its retracted position and will be positively so restrained until the handle 24 is again moved into its "down" position. After the clockwise rotation of control shaft 31 is halted by stop 34, the sprocket wheel 51 nevertheless continues to rotate in the same clockwise direction until handle 24 simultaneously reached its "up" position, whereby the dogs 51' are disengaged from the dogs 53'.

Although, for purposes of exemplification, one of the many embodiments which the inventive concepts may take has been disclosed in detail, it is to be understood that the invention contemplates other embodiments of these inventive concepts with all the various ramifications, refinements, simplifications, and even variations, that may lie within the scope of the sub-joined claims.

Having thus disclosed the inventive concepts and one form of embodiment of same, what is claimed as new and is desired to be secured by Letters Patent of the United States, is:

1. The combination with a stationary part of an aircraft and a landing gear leg hinged for movement relatively thereto, of an up-lock for said landing gear comprising a latch movable relatively to said stationary part, a complemental member fixed to the landing gear leg for engagement by said latch upon the retraction of the leg, a toggle operable between the stationary part of the aircraft and the latch to maintain engagement between said latch and the complemental member upon the substantial alignment of the sections of the toggle, means associated with the toggle constructed and arranged to counteract any tendency thereof to break upon and during interengagement between said latch and complemental member, and means effective upon the breaking of said toggle to locate said latch out of position for engagement with said complemental member.

2. The combination with a stationary part of an aircraft, having a landing gear leg hinged thereto for retraction and protraction, of an up-lock for said landing gear leg comprising a latch carried by said stationary part for movement relative thereto, a complemental member fixed to said leg to be engaged by the latch upon the retraction of the leg, means to normally locate said latch out of engaging position, means whereby the retraction of the landing gear moves said latch out of its normal position to one engaging the complemental member, a toggle disposed between the stationary part of the aircraft and the latch whereby the alignment of the sections thereof locks the latch against movement out of engagement with the complemental member aforesaid and the movement of said sections out of alignment permits the return of the latch to its normal position, and removable means associated with the knee of said toggle constructed and arranged to prevent relative movement of its sections upon their alignment.

3. The combination with a stationary part of an aircraft having a landing gear leg hinged thereto for retraction and protraction, of an uplock for said landing gear leg comprising a latch carried by said stationary part for movement relative thereto, a complemental member fixed to said leg to be engaged by the latch upon the retraction of the leg, means to normally locate said latch out of engaging position, means whereby the retraction of the landing gear moves said latch out of its normal position to one engaging the complemental member, a toggle disposed between the stationary part of the aircraft and the latch whereby the alignment of the sections thereof locks the latch against movement out of engagement with the complemental member aforesaid, a toggle interposed between the stationary part of the aircraft and the latch and a locking arm, under the control of the pilot, cooperating with said toggle either to hold the sections thereof in alignment or to permit the movement of said sections out of alignment.

4. The combination with a stationary part of an aircraft having a landing gear leg hinged thereto for retraction and protraction, of an up-lock for said landing gear leg comprising a latch carried by said stationary part for movement relative thereto, a complemental member fixed to said leg to be engaged by the latch upon the retraction of the leg, means to normally locate said latch out of engaging position, means whereby the retraction of the landing gear moves said latch out of its normal position to one engaging the complemental member, a toggle interposed between the aircraft structure and the latch, a toggle disposed between the stationary part of the aircraft and the latch whereby the alignment of the sections thereof locks the latch against movement out of engagement with the complemental member aforesaid, and a locking arm swingable under the control of the pilot to a position to lock the sections of the toggle in alignment or reversely to move the said sections out of alignment.

5. The combination with an aircraft, having a landing gear leg mounted thereon for movement to and from retracted and protracted positions, of a movable latch mounted on said aircraft, a complemental member on the landing gear leg for engagement by the latch upon the retraction of said leg, a spring urging said latch out of engaging position, means operable upon the retraction of the leg for moving said latch against the action of said spring into locking position, a toggle, interposed between the latch and a fixed part of the aircraft for maintaining said latch in its position engaging the complemental member on the leg when the sections thereof align, and a locking member interposed between the toggle and a fixed part of the aircraft to hold the sections of the toggle in alignment.

6. The combination with an aircraft, having a landing gear leg mounted thereon for movement to and from retracted and protracted positions, of a movable latch mounted on said aircraft, a complemental member on the landing gear leg for engagement by the latch upon the retraction of said leg, a spring urging said latch out of engaging position, means operable upon the retraction of the leg for moving said latch against the action of said spring into locking position, a toggle interposed between a fixed part of the aircraft and the latch, to lock the latter in engagement with the complemental member on the leg upon the substantial alignment of the toggle sections, and an arm mounted on a stationary part of the aircraft to swing to and from a position retaining the sections of the toggle in alignment.

7. The combination with an aircraft, having a landing gear leg mounted thereon for movement to and from retracted and protracted positions, of a movable latch mounted on said aircraft, a complemental member on the landing gear leg for engagement by the latch upon the retraction of said leg, a spring urging said latch out of engaging position, means operable upon the retraction of the leg for moving said latch against the action of said spring into locking position, a toggle interposed between a fixed part of the aircraft and the latch, to lock the latter in engagement with the complemental member on the leg upon the substantial alignment of the toggle sections, a projection on each section of the toggle, and an arm mounted to swing between said projections, whereby the sections of the toggle align to lock the latch in engaging position upon locating the arm adjacent one of said projections and assume positions out of alignment upon the arm operating against the other of said projections.

8. The combination with an aircraft, having a landing gear leg mounted thereon for movement to and from retracted and protracted positions, of a movable latch mounted on said aircraft, a complemental member on the landing gear leg for engagement by the latch upon the retraction of said leg, a spring urging said latch out of engaging position, means operable upon the retraction of the leg for moving said latch against the action of said spring into locking position, a toggle, interposed between a fixed part of the aircraft and the latch, to lock the latter in engagement with the complemental member on the leg upon the substantial alignment of the toggle sections, a projection upon each section of said toggle, an arm, under the control of the pilot, to swing between said projections whereby the sections of said toggle are held in alignment by said arm upon locating it adjacent one projection and assume relatively angular positions when the arm contacts the other of said projections, and a spring acting on said arm to normally retain it locking the sections of the toggle in alignment.

9. The combination with an aircraft structure, having a landing gear leg hinged thereto for retraction and protraction, of an eye fixed to said leg, a latch pivoted to the aircraft structure, provided with a hook for the engagement of the eye upon the retraction of the landing gear leg and having a control and locking notch therein, means acting on the latch to normally hold the hook out of position for engagement with the said eye, a toggle comprising a pair of sections pivoted one to the other at their adjoining ends, the outer end of one section being pivoted to the aircraft structure and the free end of the other section operating in the control notch of the latch whereby the alignment of said sections positions the free end of the last said section against an end of the notch thereby preventing the movement of the latch out of engaging position and the non-alignment of said sections permits the movement of the latch to its normal non-engaging position, and means for controlling the alignment and non-alignment of said toggle sections.

10. The combination with an aircraft structure, having a landing gear leg hinged thereto for retraction and protraction, of an eye fixed to said leg, a latch pivoted to the aircraft structure, provided with a hook for the engagement of the eye upon the retraction of the landing gear leg and having a control and locking notch therein, means acting on the latch to normally hold the hook out of position for engagement with the said eye, a toggle pivoted to the aircraft structure at one end and having its opposite end operating freely in said control and locking notch whereby the substantial alignment of said toggle with the free end thereof bearing against an end of the notch locks the hook of the latch in engagement with the eye aforesaid and the non-alignment of the toggle permits the movement of its free end in the notch and the return of the latch to its normal non-engaging position, and spring-loaded means for holding said toggle in substantial alignment.

11. The combination with an aircraft structure, having a landing gear leg hinged thereto for retraction and protraction, of an eye fixed to said leg, a latch pivoted to the aircraft structure, provided with a hook for the engagement of the eye upon the retraction of the landing gear leg and having a control and locking notch therein, means of acting on the latch to normally hold the hook out of engagement with the said eye, a toggle pivoted to the aircraft structure at one end and having its opposite end operating in said control and locking notch whereby the substantial alignment of said toggle with the free end thereof bearing against an end of the notch locks the hook of the latch in engagement with the eye aforesaid and the non-alignment of the toggle permits the movement of its free end in the notch and the return of the latch to its normal non-engaging position, an arm mounted to swing on said aircraft structure with its extremity in cooperative relationship with said toggle whereby in one of its positions the arm holds the toggle in alignment and in its opposite position permits the non-alignment of the toggle, and means under the control of the pilot to swing said arm to either of said positions.

12. The combination with an aircraft structure, having a landing gear leg hinged thereto for retraction and protraction, of an eye fixed to said leg, a latch pivoted to the aircraft structure, provided with a hook for the engagement of the eye upon the retraction of the landing gear leg and having a control and locking notch therein, means of acting on the latch to normally hold the hook out of position for engagement with the said eye, a toggle pivoted to the aircraft structure at one end and having its opposite end operating in said control and locking notch whereby the substantial alignment of said toggle with the free end thereof bearing against an end of the notch locks the hook of the latch in position to engaging the eye aforesaid and the non-alignment of the toggle permits the movement of its free end in the notch and the return of the latch to its normal non-engaging position, an arm mounted to swing on said aircraft structure with its extremity in cooperative relationship with said toggle whereby in one of its positions the arm holds the toggle in alignment and in its opposite position permits the non-alignment of the toggle, a spring urging said arm to its position holding said toggle in alignment, and means under the control of the pilot to swing said arm to either of said positions.

SETH JOHNSON.

REFERENCES CITED

The following references are of record in the file of this patent:

UNITED STATES PATENTS

| Number | Name | Date |
| --- | --- | --- |
| 2,184,057 | Parker | Dec. 19, 1939 |
| 2,292,671 | Sumner | Aug. 11, 1942 |
| 1,550,622 | Lesh | Aug. 18, 1925 |

FOREIGN PATENTS

| Number | Country | Date |
| --- | --- | --- |
| 428,539 | Great Britain | May 15, 1935 |
| 518,130 | Great Britain | Feb. 19, 1940 |
| 543,609 | Great Britain | Mar. 5, 1942 |
| 218,596 | Great Britain | July 10, 1924 |
| 832,835 | France | July 11, 1938 |